United States Patent [19]

Doty

[11] Patent Number: 5,252,823
[45] Date of Patent: Oct. 12, 1993

[54] COMBINED LIGHT SOURCE AND READOUT FOR FIBER-OPTIC SENSORS WITH REDUCED BACK-REFLECTIONS

[75] Inventor: James H. Doty, Cedar Rapids, Iowa

[73] Assignee: Rockwell International Corporation, Seal Beach, Calif.

[21] Appl. No.: 952,431

[22] Filed: Sep. 28, 1992

[51] Int. Cl.⁵ ............................................. H01J 5/16
[52] U.S. Cl. ............................... 250/227.24; 385/14; 385/39
[58] Field of Search ............... 250/227.21, 227.24; 385/14, 38, 39

[56] References Cited

U.S. PATENT DOCUMENTS

| | | | |
|---|---|---|---|
| 4,755,015 | 7/1988 | Uno et al. | 385/14 |
| 4,842,409 | 6/1989 | Arditty et al. | 356/350 |
| 4,892,374 | 1/1990 | Ackerman et al. | 385/14 |
| 5,035,483 | 7/1991 | Waitl et al. | 385/14 |
| 5,185,749 | 2/1993 | Kalman et al. | 385/39 |

Primary Examiner—David C. Nelms
Assistant Examiner—Stephone B. Allen
Attorney, Agent, or Firm—Gregory G. Williams; M. Lee Murrah; H. Frederick Hamann

[57] ABSTRACT

A combined angle-faceted, superluminescent diode and readout photodetector with an optical fiber coupled at one end of the superluminescent diode and the readout photodetector coupled at the other end wherein no fiber-optic couplers are used to couple the optical fiber with the readout photodetector.

7 Claims, 1 Drawing Sheet

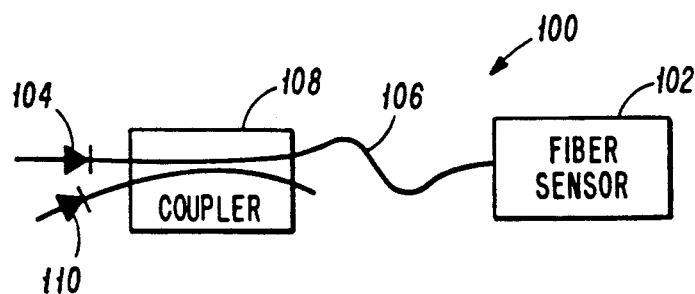
FIG. 1 *PRIOR ART*
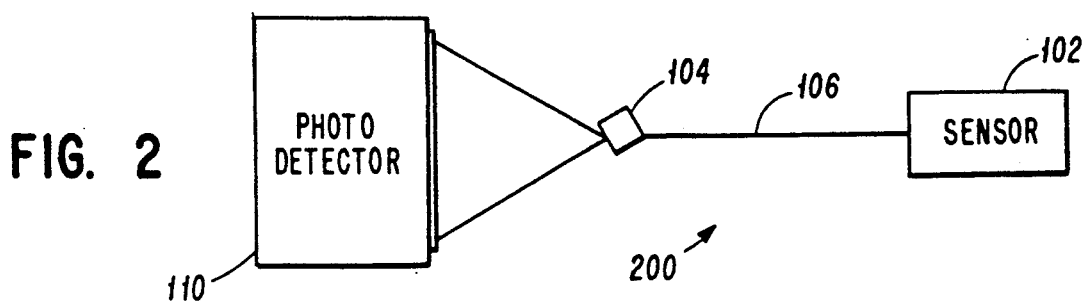
FIG. 2
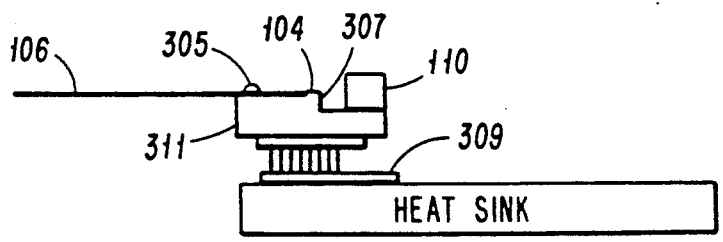
FIG. 3
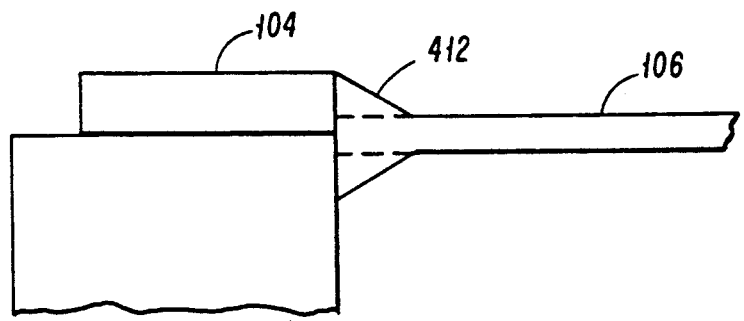
FIG. 4
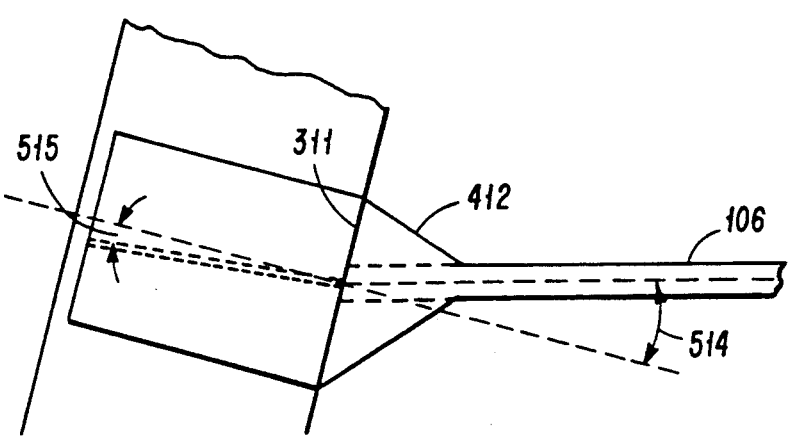
FIG. 5

COMBINED LIGHT SOURCE AND READOUT FOR FIBER-OPTIC SENSORS WITH REDUCED BACK-REFLECTIONS

FIELD OF THE INVENTION

The present invention generally relates to optical electronics and more particularly concerns fiber-optic sensor systems, and even more particularly concerns a combined light source and readout for fiber-optic sensor systems with reduced reflections into the light source.

BACKGROUND OF THE INVENTION

In the past, opto-electronics engineers have utilized optical fibers in numerous sensor systems, such as gyroscopes, microphones, hydrophones, vibration sensors, and tachometers, etc.

Typically, these sensor systems would include an optical sensor coupled to a light source by an optical fiber and would also typically include a fiber-optic coupler between the source and sensor for providing optical signals to a detector.

While this approach is common and has been utilized successfully, it does have several shortcomings. First of all, the use of fiber-optic couplers or beam splitters result in a significant loss in optical signal strength. This often requires a higher gain in the photodetector preamplifier, which tends to limit the readout band width. Additionally, the use of a fiber-optic coupler adds additional expense, especially when expensive polarization maintaining fiber optic couplers are used.

In Arditty et al U.S. Pat. No. 4,842,409, teaches that the losses associated with a coupler or beam splitter between the light source and sensor may be eliminated by using the light source as both a generator and a light amplifier. The light source is described as a laser or superluminescent diode with its front face optically coupled to the mode filtering input fiber to a fiber-gyro, and its rear face coupled to a photodetector such as a PIN diode. In optical sensors such as the fiber-optic gyro output signal fed back into the sensor will result in significant distortion of the output signal. There are several locations where back-reflections and amplified back-reflections can cause feedback into the sensor causing these distortion errors. Because solid state light sources such as the InAlGaAs SLD currently in use have optical indexes significantly higher than the fiber typically used in sensors, back-reflection can occur from the interface of the fiber to the diode facet. If an air gap exists between the diode and the fiber, the reflection can be even higher. A second, potentially larger, source of reflected signal can result from the back facet of the diode. Because the signal returning from the sensor is amplified as it passes through the light source, any slight reflections from the back facet will be returned to the sensor multiplied by twice the light source single pass gain. Reflections from the photodetector located next to the rear facet will result in a similar amplified return signal.

Consequently, there exists a need for improvement in fiber-optic sensor systems which reduce the need for higher gains in the detector preamplifier and eliminates the fiber-optic coupler and its associated expense and reduces reflections back into the light source.

SUMMARY OF THE INVENTION

It is an object of the present invention to improve the performance of a optical sensor system.

It is a feature of the present invention to eliminate a high gain detector preamplifier.

It is an advantage of the present invention to provide higher optical signal strengths without the added noise of a high gain detector preamplifier.

It is another object of the present invention to reduce reflections into the light source.

It is a feature of the present invention to use an angle-faceted SLD combined with a novel pigtailing technique and photodetector placement.

It is another advantage of the present invention to reduce the errors associated with the reflections.

The present invention includes a combined light source and readout photodetector, which is designed to satisfy the aforementioned needs, achieve the already articulated objects, include the above described features, and to produce the previously propounded advantages.

The present invention is carried out in a "reflectionless" system in the sense that the reflections in to the light source are reduced.

Accordingly, the present invention concerns a combined light source and readout for fiber-optic sensors, in which the readout or detector is positioned directly behind the light source, so that, optical signals returning back toward the light source from an optical sensor, are caused to be passed through the light source and thereby reach the detector; additionally, the light source is an angle-faceted SLD with low reflectivity.

BRIEF DESCRIPTION OF THE DRAWINGS

A more thorough understanding of the present invention may be obtained by a review of the detailed description of the invention and a review of the figures wherein:

FIG. 1 is a typical prior art optical sensor system showing a fiber-optic coupler connecting a detector with the source-sensor optical fiber.

FIG. 2 is a block diagram of the combined light source and readout photodetector of the present invention, showing the photodetector positioned behind the light source.

FIG. 3 is a side view of the combined light source and readout photodetector of the present invention disposed on a mounting apparatus.

FIG. 4 is an expanded side view of the fiber to SLD facet bond of the present invention disposed on a mounting apparatus.

FIG. 5 is an expanded top view of the fiber to SLD facet bond of the present invention disposed on a mounting apparatus.

DETAILED DESCRIPTION OF THE DRAWINGS

Now referring to the drawing, wherein like numerals refer to like matter and text throughout and more particularly referring to FIG. 1, there is shown a typical prior art fiber-optic sensor system, generally designated 100, having a fiber sensor 102, which might be a microphone, gyroscope, hydrophone, or other sensor. Also shown is a light source 104, a source-sensor fiber 106, a fiber-optic coupler 108, and a readout photodetector 110. In a typical prior art system, light is generated at the source 104 travels along the fiber 106 to the sensor 102 where it is modulated or altered in response to some external parameter to be monitored and then it is returned back on fiber 106 to coupler 108 and detected by detector 110.

Now referring to FIG. 2, there is shown a light source and readout photodetector, of the present invention, generally designated 200, which includes a fiber sensor 102, a light source 104 and an optical fiber 106 disposed there between. Photodetector 110 is shown disposed behind light source 104 and is shown with the light source optical output incident thereon.

In operation, the light source 104 generates a predetermined optical signal which travels along fiber 106 to sensor 102 where it is altered in response to some external stimuli and then returns along fiber 106 to light source 104 where it passes through to detector 110.

A more thorough understanding of the combined light source and the readout photodetector of the present invention may be obtained by now referring to FIG. 3, where there is shown a more detailed side view of the present invention.

There is shown a light source 104, which is preferably a superluminescent diode (SLD), which is either angle-faceted or antireflection coated, to reduce back-reflection. A superluminescent diode manufactured by EG&G (Edgerton, Germeshansen & Grier) with the following particular characteristics is preferred, but any light source with similar characteristics can be substituted.

The fiber 106 is preferably polarization maintaining fiber such as FS-HB-4611 available from 3M or any other fiber such as SM 85-P-5/125-SI/UV-250 from Fujikura or others with adequate optical characteristics.

The readout photodetector 110 is preferably a photodetector silicon PIN diode such as FFD-040 from EG&G or any other diode appropriate for the operating wavelength of the particular SLD chosen. The readout photodetector 110 must be spaced adequately far from the back diode facet 307, typically 1 mm, to prevent reflected light from coupling back into SLD 104. Reflectivity must be significantly low, typically $10^{-6}$, to prevent lasing in the diode and signal distortion.

To allow operation over a wide temperature range, the SLD 104 may be mounted on a thermal electric cooler 309. A small temperature sensor such as a thermistor is mounted along with SLD 104 to monitor temperature and allow a temperature control circuit to hold the SLD 104 within its operating temperature range. The precise circuit is not shown and is a function of the particular SLD chosen for any particular sensor system.

Now referring to FIGS. 4 and 5, to provide adequate optical coupling between the fiber 106 and the SLD 104, the fiber core is brought very close (on the order of one micron) to the SLD 104 front facet 311. This process is known as pigtailing. The SLD must have its optical waveguide angled with respect to its output facets 515 to reduce back-reflection, and/or at its facets antireflection coated to reduce reflectivity of both the front and back diode faces. To pigtail an angle-faceted SLD and to eliminate back-reflections, the fiber is angle-polished or tapered in some way. The fiber end may be tapered in one of several ways including, heating and pulling, etching, or grinding. Angle-polishing has proven to be a simple and reliable technique for preparing the fiber. Such an angle-faced fiber, ensures very low back-reflection into the SLD and simplifies direct bonding of the fiber to the SLD front facet 311. The end of the fiber is polished at an angle 514, so that, the end of the fiber can directly butt up against the SLD output facet. The SLD waveguide angle 515, is typically near 5 degrees, requiring a fiber end face angle 514 of approximately 10 degrees. SLDs without angle facets may be pigtailed with tapered or cleaved fiber. Special care must be taken if cleaved fiber is used to prevent back-reflection, index matching adhesives should be used between the fiber and SLD, and the SLD antireflective coating must be optimized for coupling into the fiber.

The fiber pigtail may be held in position by direct bonding of the fiber to the diode output facet or by soldering or bonding the fiber to a supporting structure attached to the diode. Optically clear adhesive 412, with optical index between that of the fiber and the SLD, is used to directly bond the fiber to the front facet 311 of the SLD 104. A large fillet of adhesive, covering the entire front facet of the SLD, and encapsulating the end of the fiber, has proven to give the best stability with temperature and mechanical stress. A fiber strain relief 305 may be provided, as indicated in FIG. 3, to protect the fiber/diode facet bond from excessive stress. A temperature sensor (not shown) is preferably attached to the main carrier to measure the SLD temperature.

The combined light source and readout photodetector of the present invention requires no special support electronics, the readout may use the same, well known in the art, electronics designs used in conventional readout approaches. The SLD 104 may be powered with a well known constant current source with a typical current on the order of 100 ma, and the photodetector current may be converted into electrical output signals by means of an AC or DC coupled transimpedance amplifier. Because of the optical gain in SLD 104, the output signal intensity is amplified so that the lower preamplifier gains may be used allowing higher output band widths and simplifying electronics design. Because of the low thermal mass of the main carrier readout assembly, mounted on the thermal electric cooler, very little thermal lag is experienced in the temperature control loop so that a simple, single stage integrating temperature control loop may be used.

It is thought that the combined light source and readout photodetector assembly, of the present invention, can be understood from the foregoing description and it should be further understood that the description herein is merely a preferred or exemplar embodiment thereof.

I claim:

1. An apparatus comprising:
    a light emission and amplification means, having a front output and a back output;
    means for reducing reflections from said front output and said back output;
    an optical fiber;
    a fiber coupling means for optically coupling the optical fiber to the front output, so that, back-reflections into the fiber are reduced;
    a light reception means optically coupled to the back ouput of the light emission means; and,
    said light reception means positioned such that reflection into the back output of said light emission and amplification means is reduced.

2. Claim 1, wherein the light emission and amplification means consists of a superluminescent diode having a front and a back facet;
    said superluminescent diode having an optical waveguide disposed therein with said optical waveguide having a predetermined propagation line;

said front facet and said back facet angled with respect to said predetermined propagation line, so that, a reduction of back-reflection occurs.

3. Claim 1, wherein the light reception means is a photodetector.

4. Claim 1, wherein the fiber coupling means consist of an angled-faced fiber bonded or positioned adjacent to, or in contact with said front output of the light emission and amplification means.

5. Claim 2, wherein the light reception means is a photodetector.

6. An optical sensor comprising:

an optical fiber for carrying optical signals;

a superluminescent diode, coupled with said optical fiber;

said superluminescent diode having a first facet and a second facet and an optical waveguide region therein with a predetermined propagation line disposed therein at a predetermined angle with respect to said first facet and said second facet;

said optical fiber being coupled with said superluminescent diode at a predetermined angle;

a base attached to said superluminescent diode; and, a photodetector attached to said base and optically coupled with said superluminescent diode, so that, a light signal emitted from the superluminescent diode is incident on the photodetector.

7. An optical sensor comprising:

a base;

a superluminescent diode, affixed to said base, said superluminescent diode having a first output and a second output and an optical waveguide region therein where said optical waveguide region has disposed therein a propagation line at a predetermined angle with respect to said first output and said second output;

an optical fiber optically coupled with said first output of said superluminescent diode; and, a photodetector, attached to said base, and optically coupled with said superluminescent diode.

* * * * *